May 8, 1962 S. SOLOWAY 3,034,008
RADIATION-RESPONSIVE APPARATUS
Filed Dec. 12, 1957

INVENTOR.
SIDNEY SOLOWAY
BY Robert Hockfield
HIS ATTORNEY

United States Patent Office 3,034,008
Patented May 8, 1962

3,034,008
RADIATION-RESPONSIVE APPARATUS
Sidney Soloway, Norwalk, Conn., assignor to Schlumberger Well Surveying Corporation, Houston, Tex., a corporation of Texas
Filed Dec. 12, 1957, Ser. No. 702,476
13 Claims. (Cl. 313—61)

The present invention relates to radiation-responsive apparatus and, more particularly, pertains to a new and improved detector of high energy neutrons.

This application is a continuation-in-part of the applicant's copending application Serial No. 414,837, filed March 8, 1954, for "Well Logging Apparatus" now Patent No. 2,967,245 issued January 3, 1961.

Although useful in a wide variety of applications, a neutron detector in accordance with the present invention is ideally suited for use in apparatus adapted to be passed through a well or borehole drilled into the earth, and of the type including a generator of high energy neutrons for irradiating earth formations traversed by the borehole and a detector for observing the resulting nuclear phenomenon. For convenience, the invention will be described as embodied in a typical system of this general character which may be employed for logging the earth formations.

In order to interpret the secondary radiations observed while logging with a generator of high energy neutrons, it may be desirable to maintain a constant or known source intensity. One prior control system for regulating neutron output is intended for use with a generator wherein particles are accelerated in a beam toward a target. Such a system is responsive to and adjusts the beam of particles in such a manner as to maintain a constant current incident on the target. Since the target may become depleted, obviously this control system may not provide the desired constant neutron output and a monitor responsive to the neutron output of the generator may be better suited for maintaining the desired constancy of neutron intensity throughout an entire logging run.

A conventional counter, which may be used for monitoring neutron output, is of the type known as a proton-recoil counter comprised of an organic compound of hydrogen. However, experience has shown this type of counter to be temperature-sensitive and thus during a logging run wherein the apparatus experiences a customary increase of temperature with depth, the monitoring may not be entirely satisfactory.

It is therefore an object of the present invention to provide a new and improved neutron detector which is not subject to the foregoing deficiencies of prior arrangements.

Another object of the present invention is to provide a new and improved neutron detector which is substantially insensitive to temperature.

Yet another object of the present invention is to provide a new and improved neutron detector which is stable enough to be used for accurate monitoring purposes.

A radiation-responsive device embodying the present invention is comprised of a chamber in which ionization may occur. Associated with the chamber is a metallic hydride wherein the hydrogen is adapted to enter into reactions with incident neutrons to produce charged particles conducive to ionization in the chamber.

The novel features of the present invention are set forth with particularity in the appended claims. The present invention, both as to its organization and manner of operation, together with further objects and advantages thereof, may best be understood by reference to the following description taken in connection with the accompanying drawing in which:

Figure 1:
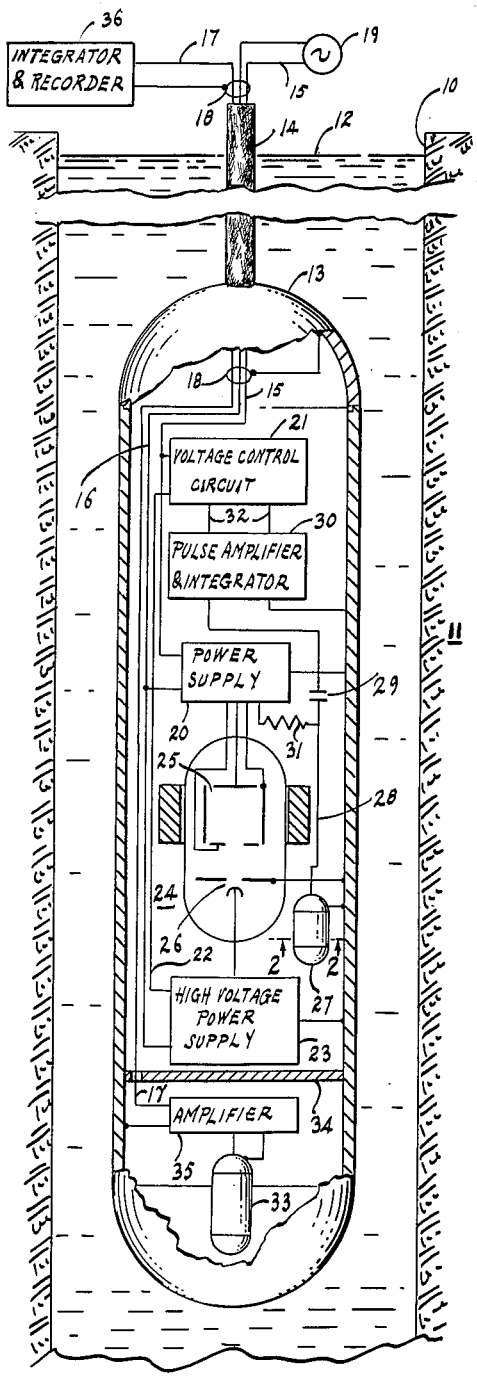
FIG. 1 is a view of longitudinal cross section of a borehole logging instrument, schematically represented, and provided with a neutron detector embodying the present invention.

In FIG. 1 of the drawing, neutron well logging apparatus provided with a neutron detector embodying the present invention is shown disposed in a borehole 10 traversing a plurality of earth formations 11. Borehole 10 usually contains a hydrogenous drilling liquid 12, such as a water base or oil base mud, and it may be lined with one or more strings of metallic casing (not shown) or it may be uncased as illustrated.

The neutron well logging apparatus may comprise a pressure resistant housing 13 suspended in the borehole by means of an armored cable 14 which, in connection with a winch (not shown) located at the surface of the earth, is utilized to lower and raise the apparatus in the borehole in a customary manner.

Cable 14 also includes a plurality of insulated conductors 15, 16 and 17 and a shield 18 for connecting surface equipment with apparatus within housing 13. Of these, conductors 15 and 16 connect a source of alternating current 19 to a medium voltage power supply 20 and via a voltage control circuit 21, to be described more fully hereinafter, and a conductor 22 to a high voltage power supply 23.

Power supplies 20 and 23 are adapted to energize a neutron generator 24 which may be of a known type including an ion source 25 wherein deuterium ions are derived and an accelerating gap 26 for accelerating such ions toward a deuterium or tritium target to a velocity at which neutron-producing reactions occur. For example, as illustrated in the drawing, ion source 25 may be of the specific type disclosed in the copending application of J. T. Dewan, Serial No. 281,378, filed April 9, 1952, now Patent No. 2,973,444 issued February 28, 1961. Power supply 20 is arranged in the manner described in the Dewan application to energize ion source 25. Accelerating gap 26 may be similar to any one of the varieties disclosed in the copending application of Wayne R. Arnold, Serial No. 414,761, filed March 8, 1954, and now Patent No. 2,914,677 issued November 24, 1959. It includes a tritium-filled target and is energized by power supply 23. If desired, neutron generator 24 may be constructed in a manner disclosed in the copending application of the present applicant referred to hereinbefore.

In order to control the neutron flux produced by the generator 24, a detector 27 embodying the present invention, and to be described in detail hereinafter, is disposed in housing 13 in the general vicinity of the target portion of accelerating gap 26. One output lead of detector 27 is grounded to housing 13 and the remaining output lead is connected by a lead 28 to a coupling condenser 29, in turn, connected to a conventional pulse amplifier and integrator unit 30. The necessary voltage for detector 27 is supplied by power supply 20 through a decoupling resistor 31.

The output potential of unit 30, which is representative of a characteristic of the generated neutron flux, such as counts per unit time, is applied to the input circuit of voltage control circuit 21 over leads 32.

Elements 20, 21, 23 and 30 may be of conventional construction, or the types described in the aforementioned Arnold application. As there stated, control circuit 21 may include a magnetic amplifier connected in a servo-circuit which compares the potential from amplifier-integrator 30 with a reference potential to derive a control effect. This control effect may be the adjustment of the value of an impedance effectively connected between leads 15 and 22. Accordingly, the potential which energizes high voltage power supply 23 is dependent upon the generated neutron flux.

To obtain a log, for example, of the resulting gamma radiation, a radioactivity responsive device or detector 33 is supported at the lower end of housing 13 below a shield plate 34 employed to shield the detector from radiation emanating from generator 24. Detector 33 may be a suitably energized Geiger-Mueller counter coupled to an amplifier 35 having its output circuit connected to lead 17 and housing 13. The output of amplifier 35 is derived at the surface of the earth by connections from lead 17 and shield 18 to an integrator and recorder unit 36. Unit 36, for example, may comprise a capacitor for deriving a potential representing the number of pulses applied per unit time and a recording voltmeter to which the potential is applied. The recording medium of the voltmeter is displaced in a customary manner in synchronism with movement of housing 13 through borehole 10 so that a continuous log may be obtained.

Figure 2:
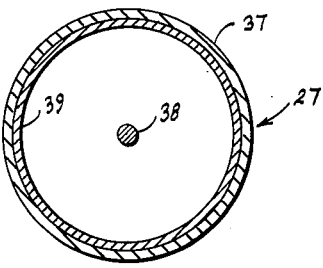
FIG. 2 is a cross sectional view taken along line 2—2 of FIG. 1 and illustrating the details of the detector constructed in accordance with the invention.

Turning now to the details of neutron detector 27 embodying the present invention, as shown in FIG. 2, the detector is comprised of a housing or envelope 37 constructed of an electrically conductive material such as brass. If desired, copper may be used for this purpose. The detector is provided with a conductive central electrode 38 which may, for example, be a tungsten wire extending through appropriate end seals (not shown) in envelope 37 of electrically insulating material as glass. The envelope 37 is lined with a layer of zirconium hydride which may be in the form of a powder fixed in a suitable binder or adhesive such as sodium silicate. In addition, envelope 37 is, after evacuation, filled with argon gas at a pressure of, for example, ½ atmosphere. However, any pressure in a range from approximately ⅕ atmosphere to several atmospheres may be employed.

In a practical embodiment of the counter illustrated in FIG. 2, envelope 37 was constructed of a brass sleeve ¾" in diameter and electrode 38 was a tungsten wire 2 mils in diameter. The envelope 37 was ⅛ of an inch in thickness as was the layer 39. In constructing the device, it was baked and outgassed in the usual way after the several elements were assembled. This was done at a temperature in the neighborhood of 100° C. to minimize loss of hydrogen from the zirconium hydride. Alternatively, the device may be baked at a higher temperature, say 400° C., and the hydrogen allowed to leave the zirconium. Thereafter, fresh hydrogen is introduced to fill the zirconium. In this way improved operation at higher temperatures is achieved.

With reference again to FIG. 1, connections to the detector 27 are completed by a lead between housings 13 and 37 and by extending lead 28 to electrode 38.

In operation, housing 13 is lowered into borehole 10 prior to the closing of a control switch (not shown). This switch connects source 19 to leads 15 and 16 and thus neutron generator 24 is energized by power supplies 20 and 23. Deuterium ions are derived in ion source 25 and some of these enter accelerating gap 26. Accordingly, highly accelerated positive deuterium ions react with tritium in the target portion of the accelerating gap and neutrons at an energy level of 14 million electron volts (mev.) are generated.

High energy neutrons emanating from generator 24 irradiate earth formations 11 and some of the resulting nuclear radiation is incident on Geiger-Mueller tube 33. Detector 33 responds to gamma radiation and its output is amplified in amplifier 35 and supplied to the integrator and recorder unit 36 so that a neutron-gamma ray log is obtained. Such a log features information regarding earth formations traversed by the borehole as enumerated in detail in the copending application of Clarke Goodman, Serial No. 275,932, filed March 11, 1952, and assigned to the same assignee as the present invention.

A small fraction of the 14 mev. neutrons emanating from generator 24 reach detector 27, traverses housing 37 and enter layer 39. Some of these neutrons enter into reactions with the hydrogen in layer 39 and the resulting recoiling protons cause ionization of the gas within the detector. Each time ionization occurs, a pulse is developed and the resulting pulses are amplified and integrated in stage 30 to develop a control potential which is supplied to voltage control circuit 21.

If the neutron flux on detector 27 increases, the number of counts per second increases, and the voltage control circuit reduces the voltage supplied to high voltage power supply 23. Accordingly, a lower voltage is applied to accelerating gap 26, thereby decreasing the neutron flux. Conversely, a decrease in the neutron flux causes an increase in the high voltage supplied to the accelerating gap. In this way, the neutron yield remains substantially constant over a wide variety of operating conditions.

At the desired operating pressure of the gas within the detector 27, namely one-half atmosphere, equilibrium between the hydrogen in layer 39 and the gas within the envelope 37 remains essentially fixed over a considerable temperature range. In other words, up to about 100° C. there is but a small increase in pressure within the envelope due to the release of hydrogen from the zirconium hydride. Accordingly, the operation of the detector is substantially unaffected by a variation in temperature.

In addition, although hydrogen might be emitted, its presence within the envelope makes it no less susceptible to interactions with neutrons than when in layer 39. Thus, the number of hydrogen atoms available for these interactions remains unchanged.

Furthermore, following the release of hydrogen due to a temperature increase, any decrease in temperature returns the detector to an equilibrium condition at which some of the emitted hydrogen is absorbed. Accordingly, the pressure conditions initially established within envelope 37 are regained.

It is evident, therefore, that a neutron detector constructed in accordance with the present invention is adapted to derive indications of incident neutrons and is substantially unresponsive to variations in ambient temperature. Thus, the detector is not subject to the deficiencies of various prior arrangements and is well adapted to monitoring the output of a neutron generator. It is ideally suited for automatic control of the output of a neutron generator.

If desired, instead of automatic control, manual control may be provided. To this end, the output of unit 30 is supplied to an indicator (not shown) at the surface of the earth instead of to control circuit 21. A suitable arrangement of a battery and a potentiometer (not shown) at the surface of the earth may be connected to leads 32 via additional conductors of cable 14 for producing a control potential to adjust circuit 21.

Obviously, conductive envelope 37 may be enclosed by an appropriate insulating sleeve to facilitate mounting of the detector while maintaining it in an electrically insulated condition relative to housing 13. For example, a fluoro-carbon, commonly referred to as Teflon, may be employed for this purpose.

Figure 3:
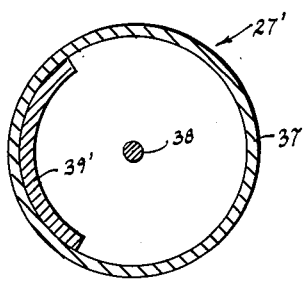
FIG. 3 is a view similar to the one represented in FIG. 2, but illustrating another form of a detector in accordance with the present invention.

In order to provide a detector having directional properties, the zirconium hydride layer may be arranged as illustrated in FIG. 3 to extend for less than one-half the circumference of the envelope on a side thereof in the general vicinity of neutron generator 24. Thus, the layer may take the form represented by numeral 39'.

Since portions of the modified detector 27' in FIG. 3 aside from the provision of layer 39' are not provided with hydrogenous material, no recoil protons are produced in response to incident neutrons. Moreover, in the case of incident neutrons traversing the interior of the detector and striking hydride layer 39', any resultant protons have maximum energy directed away from the gas within envelope 37 and do not trigger the detector. It is, therefore, evident that detector 27' is directional and the output control circuit 21 is responsive only to neutrons emanating from neutron generator 24.

Referring again to FIG. 1, if desired, a layer of hydrogenous material may be supported within housing 13 at the opposite side of generator 24, with respect to detector 27', so that high energy neutrons returning from formations 11 may be absorbed to prevent them from being counted.

In order to achieve symmetrical bombardment of the formations by neutrons emanating from the target of accelerating gap 26, monitor 27 may be mounted above or below the generator. Of course, for such an arrangement, suitable shields of hydrogenous material may be provided for the detector. Alternatively, the monitor may be arranged to encircle the neutron generator, such as by being of generally torroidal form.

Figure 4:
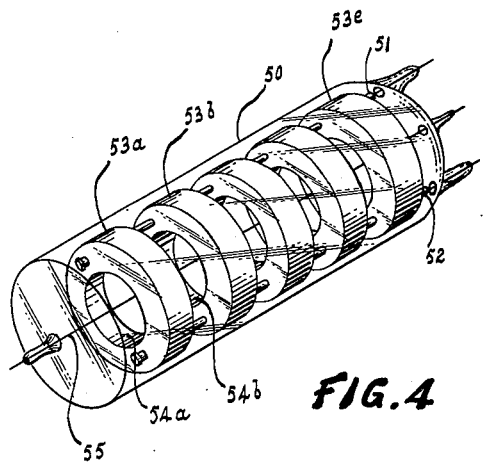
FIG. 4 is a perspective view of another embodiment of the invention.

In FIG. 4 of the drawing, a neutron detector constructed in accordance with another embodiment of the invention is shown to comprise an envelope 50 which may, for example, be constructed of glass. A pair of support rods 51 and 52 suitably sealed to the peripheries of respective openings in one end of the envelope extend in parallel relation through the envelope and through pairs of aligned openings in a plurality of discs 53a—53e. These discs have central apertures 54a—54e and are supported in spaced relationship by appropriate spacers on the rods 51, 52. They are composed of zirconium hydride in an appropriate binder such as potassium silicate, and may be formed by mixing powdered zirconium hydride with the potassium silicate and drying under pressure in an appropriate mold.

A central electrode 55 in envelope 50 passes through the several openings 54a—54e and terminates at appropriate end seals in the envelope. Electrode 55 may, for example, be composed of a tungsten wire. Envelope 50 may be filled with argon at a pressure from 10 centimeters of mercury to several atmospheres. Alternatively, a mixture of equal parts of argon and methane may be employed at a selected pressure within this range.

In a practical embodiment of the detector illustrated in FIG. 4, seven discs 53 were used. They had an outer diameter of 1¾" and the openings 54a—54e were ¾" in diameter. The discs were 3/16" thick and were spaced from one another approximately 7/16". Electrode 55 was constructed of a tungsten wire .003" in diameter and after evacuation, envelope 50 was filled with argon at a pressure of approximately 50 centimeters of mercury.

In testing a device constructed in the foregoing manner, it was operated as a proportional counter at a potential of 2,000 volts. Readings were made of the counting rate versus the output pulse height at temperatures ranging from approximately 20° C. to 100° C. The results of these tests indicated no substantial variation in operating efficiency over this temperature range.

Although it has been stated that in forming counters embodying the present invention, powdered zirconium hydride may be consolidated in an appropriate binder, it is within the contemplation of the present invention to construct the hydrogen-containing element by appropriately binding or sintering powdered zirconium. The element thus constituted may be mounted in place within the detector and the detector thereafter processed in the normal manner to eliminate all impurities. Thereafter, the detector may be heated to a temperature in a range from 200° to 500° F. and hydrogen introduced to the envelope so that the hydrogen may be absorbed in the zirconium-containing element.

It is also within the contemplation of the present invention to employ other metals such as tantalum, titanium, or lithium. In the latter case, lithium hydride may be dry pressed to form an amorphous mass which may be mounted within the detector. In the case of a lithium hydride element, operation at elevated temperatures to 400° C. are possible.

Obviously, other filling gases may be employed for a detector embodying the present invention. Thus, any of the other noble gases such as krypton or xenon may be employed. Of course, argon may be mixed with a suitable quenching gas such as carbon dioxide, ethylene, ammonia or the like.

The central electrode (wire 38 in FIG. 2 or wire 55 in FIG. 4) may take any of a variety of forms. Thus, instead of being straight, as shown, it may be circular. Alternatively, a series of wires may be used. For example, they may be supported parallel to one another and electrically connected together.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. A radiation-responsive device for deriving indications of incident fast neutrons comprising a chamber wherein ionization may occur, and a substance supported within said chamber and adapted to enter into reactions with incident fast neutrons to release charged particles into said chamber conducive to said ionization, said substance being comprised, at least in part, of a metallic hydride, and said chamber containing an ionizable gas substantially within the pressure range from ⅕ atmosphere to several atmospheres.

2. A radiation-responsive device for deriving indications of incident neutrons comprising a chamber wherein ionization may occur, a pair of electrodes having conductive surfaces supported within said chamber, one of said electrodes being comprised, at least in part, of a metallic hydride, and said chamber containing an ionizable gas substantially within the pressure range from ⅕ atmosphere to several atmospheres.

3. A radiation-responsive device comprising a chamber wherein ionization may occur, a layer of a metallic hydride disposed on an inner wall of said chamber, and an electrical conductor supported within said chamber, but electrically insulated from said layer, and said chamber containing an ionizable gas substantially within the pressure range from ⅕ atmosphere to several atmospheres.

4. A radiation-responsive device comprising a chamber wherein ionization may occur, a layer comprised, at least in part, of a metallic hydride covering a portion of inner wall of said chamber, and an electrical conductor supported within said chamber, but electrically insulated from said layer, and said chamber containing an ionizable gas substantially within the pressure range from ⅕ atmosphere to several atmospheres.

5. A radiation-responsive device comprising a hollow enclosure of electrically conductive material having inner and outer walls, a layer of metallic hydride supported by said inner wall of said enclosure, and an electrical conductor supported within said chamber, but electrically insulated from said layer, and said chamber containing an ionizable gas substantially within the pressure range from ⅕ atmosphere to several atmospheres.

6. A radiation-responsive device comprising a chamber wherein ionization may occur, a layer of metallic hydride supported on a wall portion of said chamber for releasing recoil protons into the interior of said chamber in response to incident fast neutrons, and an electrical conductor supported within said chamber, but electrically insulated from said layer, and said chamber containing an ionizable gas substantially within the pressure range from ⅕ atmosphere to several atmospheres.

7. A radiation-responsive device according to claim 6 wherein said metallic hydride is zirconium hydride.

8. A radiation-responsive device according to claim 6 wherein said metallic hydride is lithium hydride.

9. A radiation-responsive device comprising an envelope containing an ionizable gas, a plurality of annular rings of a metallic hydride supported within said envelope in axially spaced relation to one another to provide an electrode, and an electrode wire supported within said envelope and extending through said rings, and said chamber containing an ionizable gas substantially within the pressure range from ⅕ atmosphere to several atmospheres.

10. A radiation-responsive device comprising a glass envelope filled with an ionizable gas, a plurality of ring-like members of a metallic hydride supported in axially spaced relation to one another within said envelope, means electrically connecting said rings to one another and for introducing an electrical connection to said rings through said envelope while maintaining the fluid integrity thereof, an electrode extending through said rings, and means for introducing an electrical connection to said electrode while maintaining the fluid integrity of said envelope, and said chamber containing an ionizable gas substantially within the pressure range from ⅕ atmosphere to several atmospheres.

11. A radiation-responsive device comprising a chamber wherein ionization may occur, a substance enclosed by said chamber and adapted to enter into reactions with incident neutrons to produce charged particles, said substance being composed of a powdered metallic hydride and a binder, and an electrode supported within said chamber, and said chamber containing an ionizable gas substantially within the pressure range from ⅕ atmosphere to several atmospheres.

12. Apparatus according to claim 11 wherein said binder is potassium silicate.

13. Apparatus according to claim 11 wherein said metallic hydride is zirconium hydride and said binder is potassium silicate.

References Cited in the file of this patent

UNITED STATES PATENTS

| | | |
|---|---|---|
| 2,206,634 | Fermi et al. | July 2, 1940 |
| 2,457,781 | Metten et al. | Dec. 28, 1948 |
| 2,721,944 | Ruble | Oct. 25, 1955 |

OTHER REFERENCES

The Reactor Handbook, vol. 3, Materials, published by Technical Information Service, U.S. Atomic Energy Commission, Declassified Edition, February 1955, Chap. 1, 10, pages 155–168.